United States Patent [19]
Sato

[11] Patent Number: 6,041,158
[45] Date of Patent: *Mar. 21, 2000

[54] COPY PROTECTION BY INSERTING A PHASE-SHIFTED COLOR BURST SIGNAL INTO THE BURST INTERVAL OF AN ANALOG COLOR VIDEO SIGNAL

[75] Inventor: Hideo Sato, Tokyo, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/733,431

[22] Filed: Oct. 18, 1996

[30] Foreign Application Priority Data

Oct. 27, 1995 [JP] Japan .................................. 7-303494

[51] Int. Cl.[7] ............................................ H04N 5/76
[52] U.S. Cl. .................................. 386/1; 386/94; 380/5
[58] Field of Search ........................ 386/1, 94; 360/60; 380/5, 7, 10, 12, 15, 22; H04N 5/76, 5/92

[56] References Cited

U.S. PATENT DOCUMENTS

| | | | |
|---|---|---|---|
| 4,577,216 | 3/1986 | Ryan | 380/5 |
| 4,626,890 | 12/1986 | Ryan | 380/5 |
| 4,631,603 | 12/1986 | Ryan | 360/60 |
| 4,639,777 | 1/1987 | Mori | 380/12 |
| 4,691,353 | 9/1987 | Farmer | 380/10 |
| 4,825,299 | 4/1989 | Okada et al. | 386/26 |
| 5,251,041 | 10/1993 | Young et al. | 386/94 |
| 5,315,448 | 5/1994 | Ryan | 386/94 |
| 5,510,900 | 4/1996 | Shirochi et al. | 360/60 |
| 5,579,120 | 11/1996 | Oguro | 386/94 |
| 5,784,523 | 7/1998 | Quan et al. | 386/1 |

FOREIGN PATENT DOCUMENTS

| | | |
|---|---|---|
| 29 24 453 | 1/1981 | Germany . |
| 2924 453 A1 | 1/1981 | Germany . |
| 33 06 174 | 8/1984 | Germany . |
| 3306 174 A1 | 8/1984 | Germany . |
| WO 96/36174 | 11/1996 | WIPO . |

*Primary Examiner*—Thai Tran
*Attorney, Agent, or Firm*—Frommer Lawrence & Haug, LLP.; William S. Frommer

[57] ABSTRACT

An analog color video signal is prevented from being satisfactorily copied by inserting a phase-shifted color burst signal of predetermined duration into a predetermined location of the usual burst interval of that analog color video signal. The predetermined location may precede the normal color burst signal, or it may follow the normal color burst signal or it may be located in the middle of the burst interval.

47 Claims, 9 Drawing Sheets

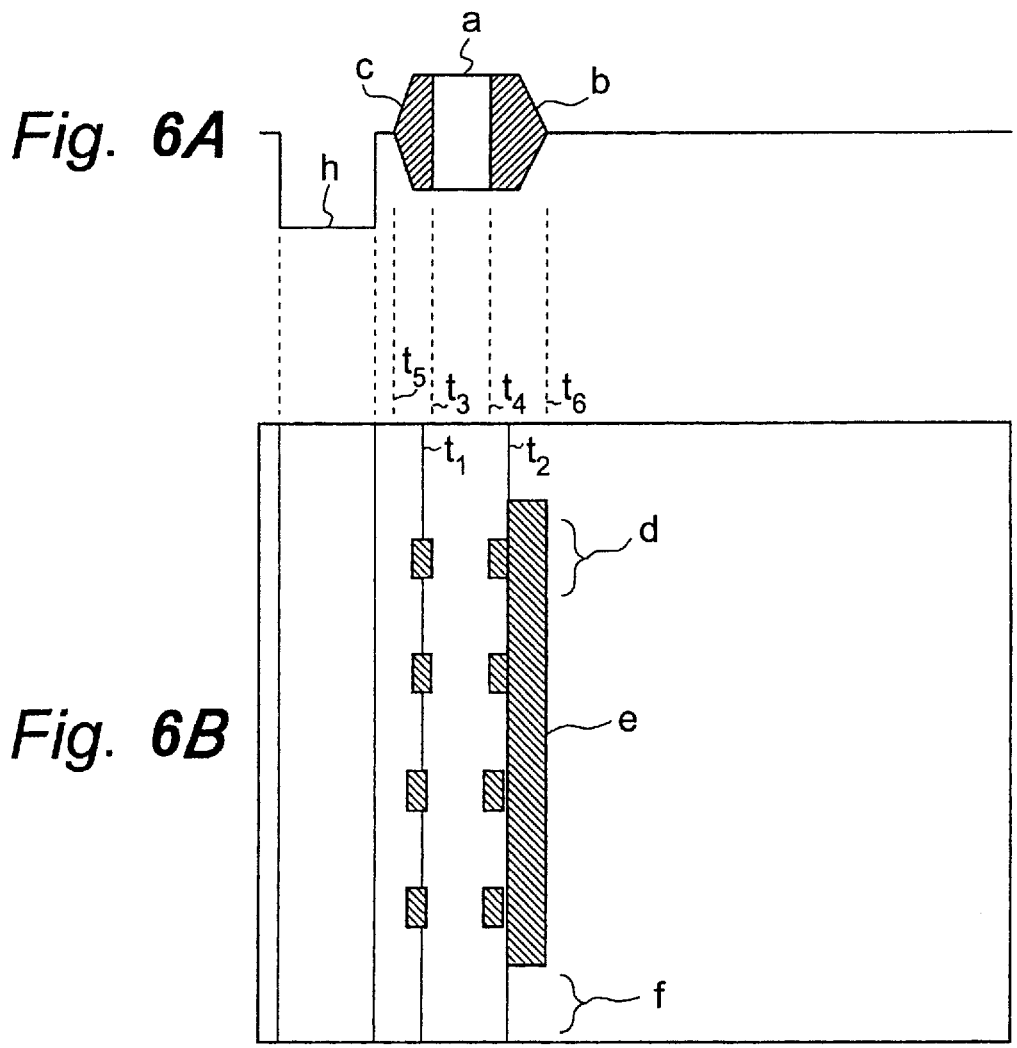

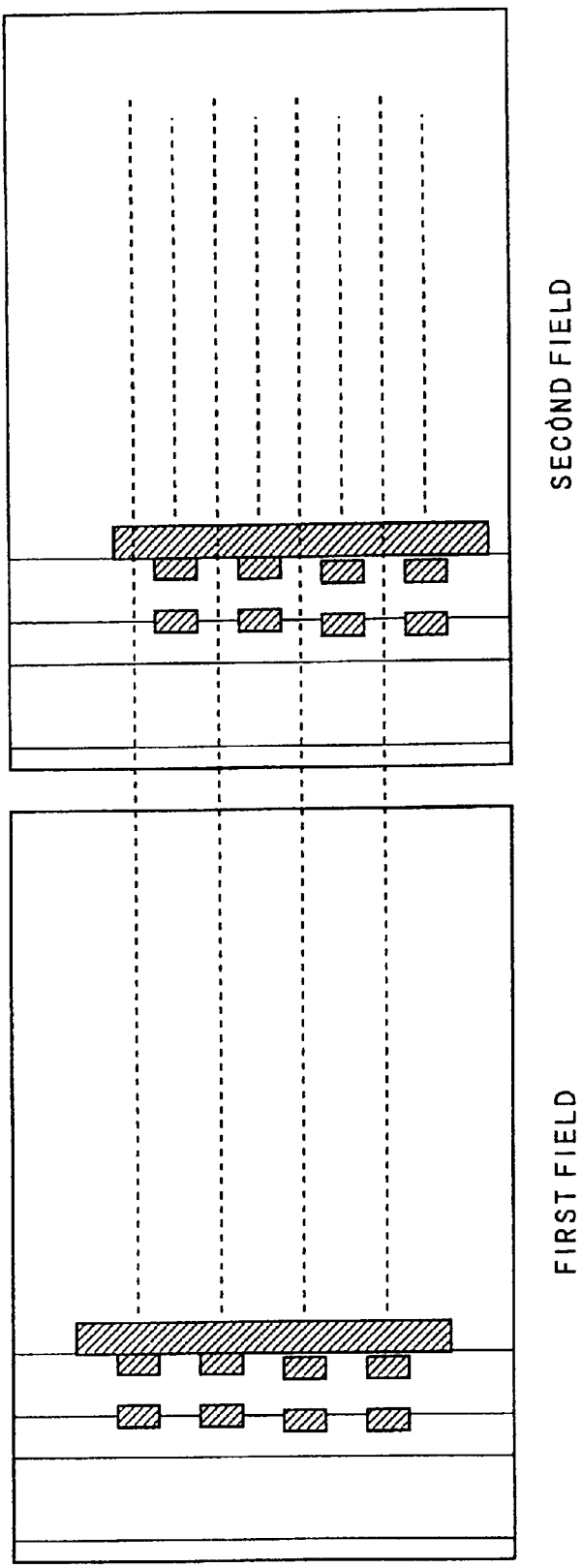

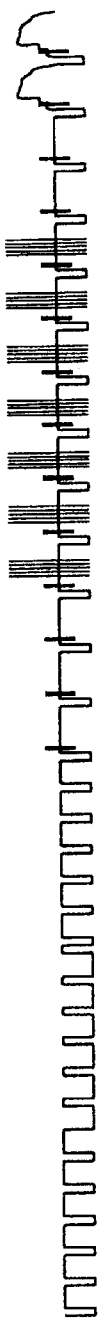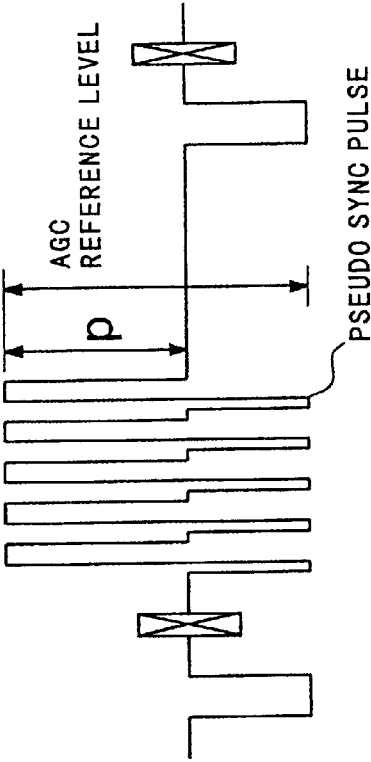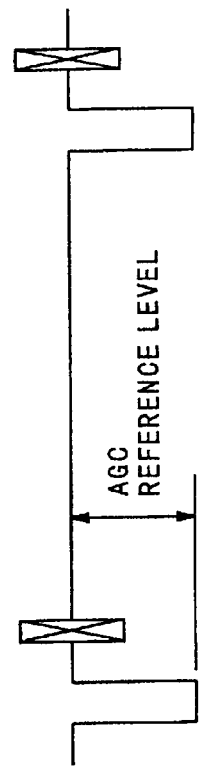
Fig. 10A (PRIOR ART)
Fig. 10B (PRIOR ART)
Fig. 10C (PRIOR ART)

COPY PROTECTION BY INSERTING A PHASE-SHIFTED COLOR BURST SIGNAL INTO THE BURST INTERVAL OF AN ANALOG COLOR VIDEO SIGNAL

BACKGROUND OF THE INVENTION

This invention relates to preventing an analog color video signal from being satisfactorily copied and, more particularly, to a technique for modifying the usual color burst interval of the analog color video signal such that when the modified video signal is recorded and then reproduced, the reproduced color video picture is severely deteriorated.

Copy protection techniques for preventing the unauthorized copying, or re-recording, of analog video signals are well known. Such techniques, also known as copy guard processing, generally employ either or both of two separate processes. In one copy guard technique, the usual automatic gain control (AGC) circuit of an analog video recorder is deceived into detecting a signal level that appears to be too high, thereby reducing the gain of the video signal that is recorded; and as a result, the level of the recorded signal is too low to recover. Such an AGC copy guard process inserts pulses, referred to as pseudo-sync pulses, in predetermined line intervals of the usual vertical blanking interval of the analog video signal.

FIG. 10A schematically represents those line intervals of the vertical blanking interval into which the pseudo-sync pulses are inserted; and FIG. 10B represents a number of cycles (e.g. 5 cycles) of such pseudo-sync pulses.

Typically, the AGC circuit of a consumer-type analog video recorder detects the difference between the sync tip level and the reference level of the video signal in the vertical blanking interval. This difference is known as the AGC reference level, shown in FIG. 10C, and differences in the AGC reference level are used to vary the gain of the recording circuitry. However, when the pseudo-sync pulses are inserted into these line intervals, such as shown in FIG. 10B, the AGC reference level detected by the AGC circuit of the video recorder now extends between the negative tip of the pseudo-sync pulses and the positive tip of those pulses, the latter admitting of a level p above the expected reference level. This deceptively large AGC reference level causes the AGC circuit of the video recorder to reduce the gain of the recording circuit, thereby reducing the recorded level of the video signal to substantially zero.

While the use of such pseudo-sync pulses has proven effective in most consumer video recorders, a number of video recorders do not rely upon the difference between the sync tip and the reference level of the video signal in the horizontal blanking interval to control the gain of the recording circuits. Examples of such video recorders include β-type recorders, 8 mm video recorders and certain sophisticated VHS type video recorders.

In an effort to prevent the unauthorized copying of color video signals in such analog video recorders, a so-called color stripe copy guard technique has been introduced. In the color stripe process, the phase of the usual color burst signal is inverted on a generally repetitive basis. For example, the color burst signal in a block of two line intervals or in a block of four line intervals is inverted; and each frame is formed of a number of blocks having a repetitive pitch, for example, twenty lines. As a numerical example, the phase of the color burst signal may be inverted in lines 22 and 23, 42 and 43, 62 and 63, etc. Because of such phase inversions, when this analog video signal is recorded, the automatic phase control (APC) circuit of the recording circuit is subjected to error; and the resultant video picture that ultimately is reproduced from that recorded signal exhibits annoying color stripes, such as shown in FIG. 11.

Since the color burst signal of a relatively small percentage of the line intervals exhibits phase inversion, the phase locked loop (PLL) circuit of the APC circuit in a conventional television receiver normally is not affected. This is because the time constant of such PLL circuit, and particularly the PLL circuit that generates the local sub-carrier used to demodulate the color signal in the television receiver, exhibits a relatively high time constant. Consequently, the PLL circuit is unable to follow relatively brief burst signal phase perturbations, such as those phase inversions that occur every two- or every four-out-of-twenty lines. But, since the APC circuit of the consumer analog video recorder exhibits a low time constant, such APC circuit is able to follow these phase inversions, which are interpreted as phase errors and are used by the video recorder to correct such non-existent errors. Hence, the inherently rapid response time of the video recorder APC circuit results in the recording of deteriorated video signals.

However, when color stripe processing is used to record the video signal of pre-recorded video tapes, such as pre-recorded tapes that are commercially available for sale or rental, the rapid response time of the APC circuit in the playback circuit enables the video recorder to follow and "correct" for such phase inversions. Consequently, when a pre-recorded video tape having color stripe processed video signals recorded thereon is reproduced, the resultant video picture often exhibits undesired defects.

OBJECTS OF THE INVENTION

Therefore, it is an object of the present invention to provide an improved color stripe processing technique which prevents an analog color video signal from being satisfactorily copied, but, nevertheless, permits an acceptable video picture to be reproduced therefrom.

Another object of this invention is to provide an improved color stripe processing technique which can be applied to pre-recorded video tapes without introducing defects or deterioration into the video picture reproduced from those tapes.

A further object of this invention is to provide an improved color stripe processing technique that can be used to prevent a pre-recorded video tape from being copied but, nevertheless, permits an acceptable video picture to be reproduced from such pre-recorded video tape.

A still further object is to provide a copy-protected record medium which will not be satisfactorily copied but will permit an adequate video picture to be reproduced therefrom.

Various other objects, advantages and features of the present invention will become readily apparent from the ensuing detailed description, and the novel features will be particularly pointed out in the appended claims.

SUMMARY OF THE INVENTION

In accordance with this invention, a copy guard technique is provided wherein a copy protection signal formed of a phase-shifted color burst signal of predetermined duration is inserted into a predetermined location of the usual color burst signal of an analog video signal. Preferably, the phase-shifted color burst signal exhibits a phase shift of 90° or 180° relative to the phase of the normal color burst signal.

In accordance with one aspect of this invention, the phase-shifted color burst signal is inserted into a location in the burst interval which precedes the normal color burst signal. As a feature of this aspect, the duration of the phase-shifted color burst signal commences before the burst interval begins and terminates during a beginning portion of the burst interval.

As another aspect of this invention, the phase-shifted color burst signal is inserted into the burst interval at a location which follows the normal color burst signal. As one feature of this aspect, the inserted phase-shifted color burst signal commences at the time that the normal burst interval ends. Alternatively, and as another feature, the phase-shifted color burst signal commences before the normal burst interval ends and terminates after that burst interval ends, such as a number of burst signal cycles after the end of the burst interval.

As a still further aspect of this invention, the phase-inverted color burst signal both precedes and follows the normal color burst signal.

As yet another aspect, the phase-shifted color burst signal is inserted into the central portion of the normal burst interval.

In accordance with another feature of this invention, the amplitude of a portion of the phase-shifted color burst signal is increased relative to the amplitude of the normal color burst signal.

As yet another feature of this invention, the phase-shifted color burst signal is inserted in a pre-determined number of successive line intervals of the analog color video signal, such as in two or four successive line intervals, thereby constituting a block, and these blocks exhibit a repetitive pitch in each field or in alternate fields of each frame of video signals. Alternatively, the block of line intervals which contains the phase-shifted color burst signal may be provided only in the vertical blanking interval of the video signal.

In accordance with an additional aspect, an improved record medium is copy-protected by recording thereon information which, when reproduced, causes the phase-shifted burst signal described above to be generated and inserted into the produced video signal.

BRIEF DESCRIPTION OF THE DRAWINGS

The following detailed description, given by way of example and not intended to limit the present invention solely thereto, will best be understood in conjunction with the accompanying drawings in which:

FIGS. 6A and 6B are waveform diagrams representing the copy guard technique in accordance with one aspect of the present inventions;

FIGS. 7A and 7B schematically represent blocks of copy protection signals produced in accordance with an embodiment of the present invention;

FIGS. 10A–10C are timing diagrams which schematically represent a prior art copy guard technique using AGC processing;

DETAILED DESCRIPTION OF PREFERRED EMBODIMENTS

Figure 1A:
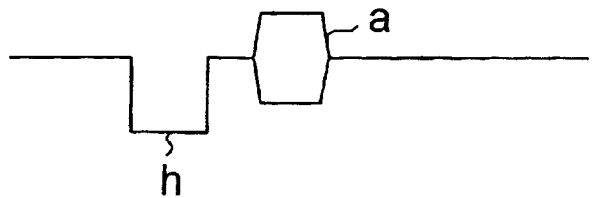
FIGS. 1A and 1B schematically represent the burst signal that is recorded and reproduced, respectively, by a consumer video recorder.

Referring now to FIG. 1A, there is illustrated a waveform of a portion of the horizontal blanking interval of each line of an analog color signal. As is conventional, the horizontal blanking interval includes the horizontal synchronizing pulse h followed by the burst interval a, the latter including a predetermined number of cycles of the chrominance subcarrier which, in the NTSC system is about 9 cycles at a frequency of about 3.58 MHz. FIG. 1A illustrates that the envelope of the burst signal increases and decreases gradually, that is, the envelope thereof does not change instantaneously from its blanking level (10 IRE) to its reference level (30 IRE).

Figure 1B:
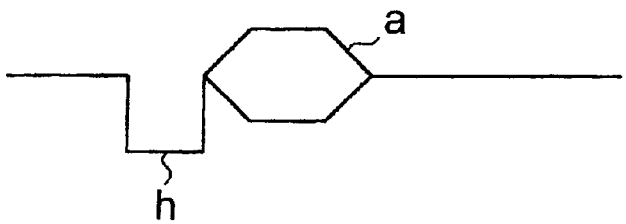

As is known, when an analog color video signal is recorded on a conventional analog video recorder, the color signal components, including the burst signal, are down-converted to a frequency band below the frequency band of the luminance components; and when the recorded color video signal is played back, the color signal components, including the burst signal, are reconverted to their original frequency band. As a result of the down-conversion and up-conversion of the burst signal, the burst interval shown in FIG. 1A tends to expand so as to exhibit the waveform shown in FIG. 1B. This expansion, referred to herein as time-axis expansion, tends to "stretch" the burst interval, thereby substantially eliminating the spacing between the end of the horizontal synchronizing pulse and the beginning of the burst signal. The present invention relies upon this inherent time-axis expansion of the burst signal in down-converting and up-converting the color signal components in a video recorder to impart copy protection both to a pre-recorded color video signal and to a "live" color video signal (e.g. a color signal received in real time).

In particular, the present invention inserts into the burst interval a phase-shifted version of the burst signal. In one embodiment, the phase-shifted burst signal is placed immediately following the usual burst signal of normal (or reference) phase, such as shown by the hatched area in FIG. 2B, or immediately preceding the normal burst signal, as shown by the hatched area in FIG. 2C, or both preceding and following the normal burst signal, as shown by the hatched area in FIG. 2D. Here, the phase-shifted burst signal, which acts as the copy protection signal, is designated by the reference numeral b when the phase-shifted burst signal follows the normal burst signal, and by the reference numeral c when the phase-shifted burst signal precedes the normal burst signal. In FIGS. 2A–2D, the normal burst signal, that is, the burst signal exhibiting the reference phase, is identified by reference numeral a. Assuming the normal burst signal is formed of 9 cycles of the chrominance subcarrier, the phase-shifted burst signal b is formed of 2 cycles of the phase-shifted chrominance subcarrier and the phase-shifted burst signal c likewise is formed of 2 cycles. In one embodiment, the phase-shifted burst signal is 180° out-of-phase with respect to the reference burst signal; and in another embodiment, the phase-shifted burst signal is 90° out-of-phase. Although other phase shifts may be used, the 180° and 90° phase shifts are preferred.

Figure 3A:
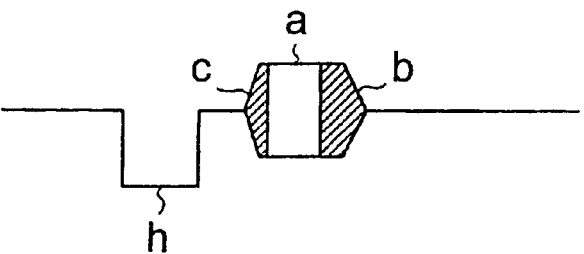
FIGS. 3A and 3B are waveforms representing the color burst signal, modified in accordance with the present invention, which is recorded and reproduced, respectively, by a consumer video recorder.
Figure 3B:
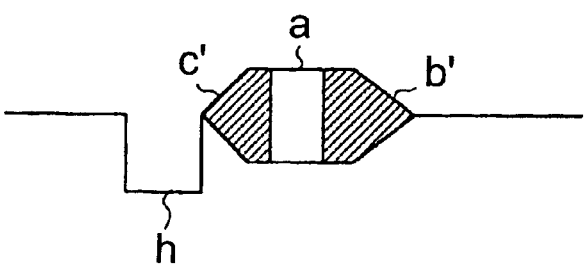
Figure 2A:
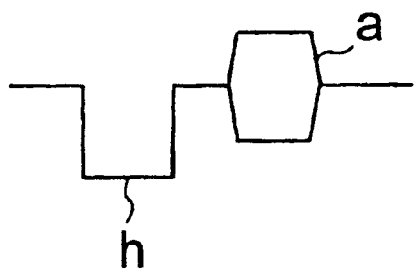
FIGS. 2A–2D are waveforms representing embodiments of the present invention.
Figure 2B:
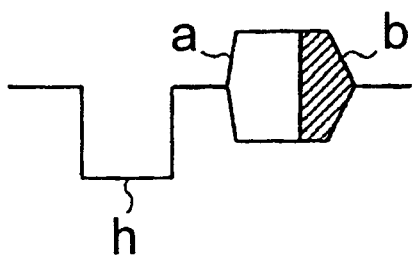
Figure 2C:
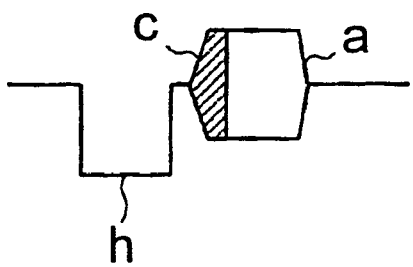
Figure 2D:
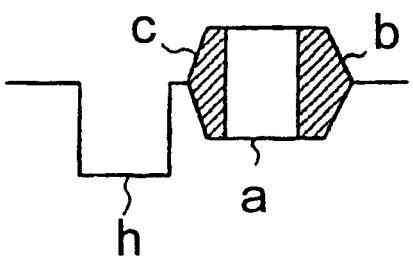

FIGS. 2A–2D illustrate the envelopes of the burst signal, including the insertion into the burst interval of the phase-shifted burst signal, prior to recording thereof. That is, the frequency of the chrominance subcarrier depicted in FIGS. 2A–2D is about 3.58 MHz. Of course, the burst signal and phase-shifted burst signal are down-converted for recording on the analog video recorder; and when the video signal is reproduced, such burst signal and phase-shifted burst signal are up-converted. As a result, and as has been described with reference to FIGS. 1A–1B, the reproduced burst signal and phase-shifted burst signal exhibit time-axis expansion. FIG. 3A illustrates the copy-protected burst signal prior to recording (that is, before the burst signal is down-converted) and FIG. 3B illustrates the envelope of the copy-protected burst signal after reproduction (i.e., after the copy-protected burst signal has been down-converted and then up-converted). It will be seen from FIG. 3B that the reproduced phase-shifted burst signal b' exhibits a duration greater than the original duration occupied by the phase-shifted burst signal b; and, similarly, the reproduced phase-shifted burst signal c' exhibits a duration that exceeds the original duration of the phase-shifted burst signal c. Moreover, because of the time-axis expansion, the reproduced phase-shifted burst signals b' and c' "leak" into the interval originally occupied solely by the normal burst signal of reference phase. This leakage phenomenon tends to compress the reference phase burst duration. Nevertheless, the PLL circuit of the APC circuit of the conventional television receiver is too slow (i.e., its inherent time constant is too large) to lock onto the phase-shifted burst signal. Consequently, such PLL circuit with the relatively high time constant cannot follow the phase-shifted burst signal, and the insertion of the phase-shifted burst signal is not sufficient to interfere with the PLL circuit of the conventional television receiver.

But, because of the low time constant of the PLL circuit in the video recorder, such PLL circuit is fast enough to follow the time-axis expanded phase-shifted burst signal as well as the normal burst signal. Hence, the oscillator included in the PLL circuit locks onto the phase-shifted burst signal so that when the line interval that contains the phase-shifted burst signal is color demodulated, the phase of the color signal differs from the phase of the demodulating signal to distort the hue of that line. That is, the resultant color signal that is output from the video recorder during up-converting causes a severely distorted hue for those lines which contain the phase-shifted burst signal.

Figure 4:
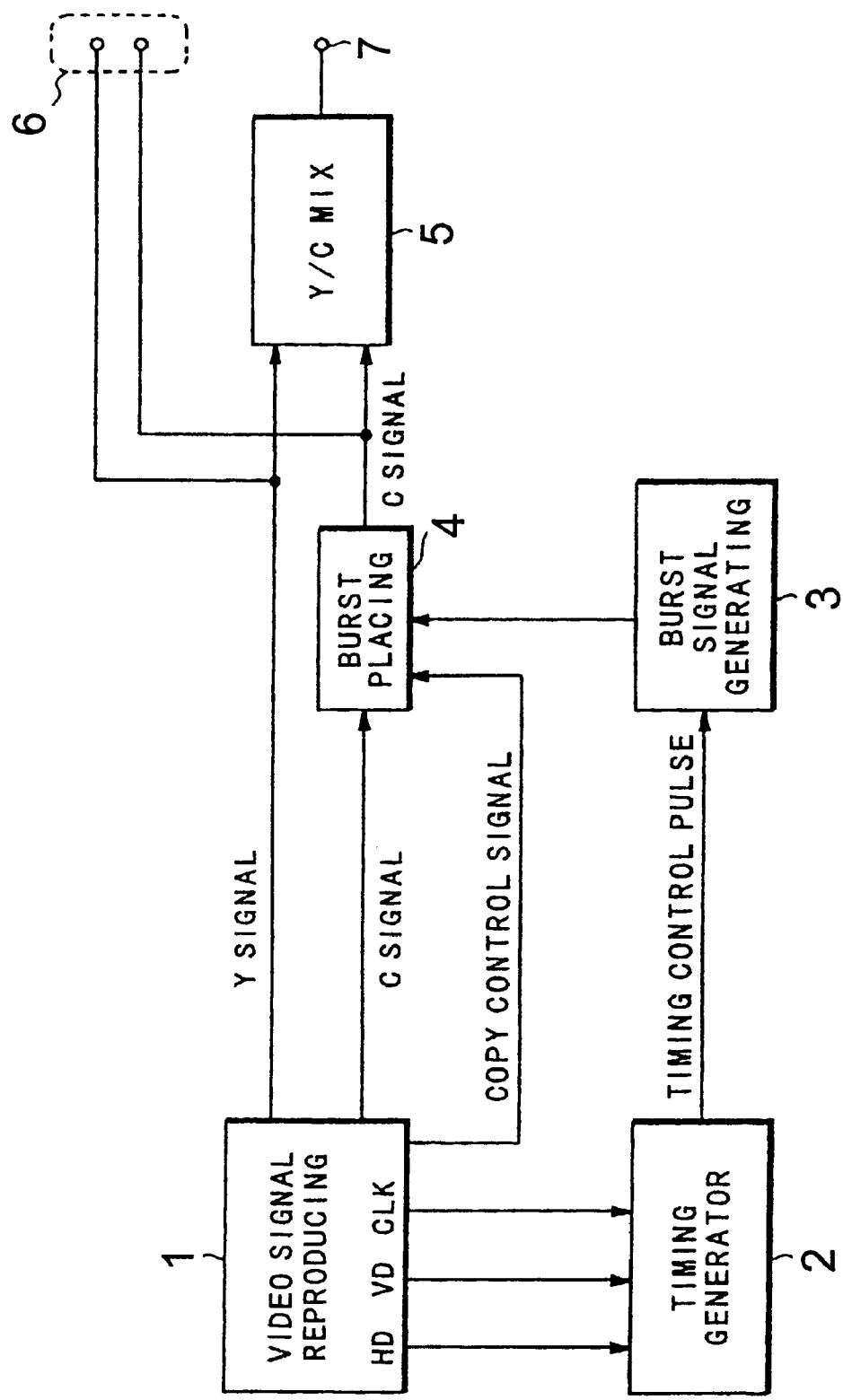
FIG. 4 is a block diagram of apparatus which carries out the present invention.

Referring now to FIG. 4, there is illustrated a block diagram of apparatus used to insert into a predetermined location of the burst interval of the color video signal the phase-shifted burst signal for a predetermined duration. Here, the phase-shifted burst signal, that is, the copy protection signal, is inserted into the color video signal that is reproduced by a video signal reproducing device 1, although it will be appreciated that the copy protection signal may be inserted into a "live" color video signal. Examples of the video signal reproducing device include a digital video recorder, an analog video recorder, a laser disk player, a digital video disk player, a computer-generated video signal player, a CD-ROM player, a video signal receiver, or the like. Preferably, and in accordance with the best mode of this invention, digital apparatus is used as or with the video signal reproducing device, and it will be appreciated that the resultant digital video signal obtained therefrom is converted to analog form.

Video signal reproducing device 1 generates from a record medium loaded therein a luminance signal Y and a color signal C as respective outputs on separate output terminals. The video signal reproducing device also generates, as individual outputs, a horizontal synchronizing signal HD, a vertical synchronizing signal VD and a clock signal CLK, the latter constituting a high frequency system clock. For example, the clock signal CLK may be generated by a PLL circuit included in video signal reproducing device 1 for the purpose of synchronizing the chrominance subcarrier. The video signal reproducing device also is adapted to generate a copy control signal which determines whether the reproduced color video signal should be modified to include a copy protection signal (e.g., to included the phase-shifted burst signal). In its simplest form, the copy control signal may be a "1" when the color video signal is to be modified with a copy protection signal and a "0" when the color video signal is not to be so modified; and is generated in response to copy control information that may be recorded on and, thus, reproduced from the record medium.

A timing generator 2 is coupled to video signal reproducing device 1 to receive the horizontal and vertical synchronizing signals HD and VD and also the clock signal CLK to generate the timing control pulses that are used to control the insertion of the phase-shifted burst signal into the burst interval of the color video signal. Such timing control pulses establish the duration of the phase-shifted burst signal and the time of occurrence thereof; the latter serving to select the predetermined location or locations of the burst interval in which the phase-shifted burst signal is inserted. Such timing control pulses also are used to determine the phase shift (e.g., 90°, 180° or other) of the phase-shifted burst signal and assure that the frequency of the phase-shifted burst signal is identical to the frequency of the normal (or reference phase) burst signal. The construction of timing generator 2 to achieve the aforenoted functions is well within the skill of one of ordinary skill in the art.

A burst signal generator 3 is coupled to timing generator 2 and responds to the timing control pulses generated by the timing generator to generate the phase-shifted burst signal of duration, phase and timing determined by the timing control pulses. As used herein, the "timing" of the phase-shifted burst signal is intended to mean the particular location or locations of the burst interval into which the phase-shifted burst signal is inserted. In this regard, the timing control pulses include a phase control pulse which, as described below in conjunction with FIGS. 5B–5D, establishes the timing of the phase-shifted burst signal. Also, and as will be described in conjunction with FIG. 5D, burst signal generator 3 is adapted to change the amplitude of a predetermined portion (or portions) of the phase-shifted burst signal. For example, assuming the amplitude of the phase-shifted burst signal is equal to the amplitude of the normal, or reference phase, burst signal, the burst signal generator is adapted to increase the amplitude of the phase-shifted burst signal in a predetermined portion thereof. Hence, only a portion of the phase-shifted burst signal may exhibit a higher gain than the remainder of the phase-shifted burst signal. Thus, the timing control pulses generated by timing generator 2 may include, in addition to the phase control pulse, a gain control pulse which controls the gain of the phase-shifted burst signal.

A burst placing circuit 4 is coupled to video signal reproducing device 1 and to burst generator 3 and is adapted to insert the copy protection signal produced by the burst signal generator into the color signal component of the video signal. More particularly, burst placing circuit 4 receives the color signal component C and the copy control signal produced by the video signal reproducing device and functions to insert into the burst interval of the color signal component the phase-shifted burst signal produced by the burst signal generator, depending upon the state of the copy control signal. In the example discussed above, if the copy control signal is a "1", burst placing circuit 4 inserts the phase-shifted burst signal produced by burst signal generator 3 into the burst interval of the color signal C. On the other hand, if the copy control signal is a "0", the burst placing circuit does not insert the phase-shifted burst signal into the burst interval.

A Y/C mixer 5 is coupled to video signal reproducing device 1 and to burst placing circuit 4 to mix the luminance component Y and the color signal C, the latter having been modified by the copy protection signal, to produce a composite, copy-protected color video signal at its output terminal 7. Output terminal 7 may be coupled to a video recorder and/or to a monitor. If supplied to a monitor, it is appreciated the color video signal may be suitably displayed as a video picture without noticeable distortion or deterioration. If an analog video recorder is coupled to output terminal 7, the modified color video signal is subjected to down-conversion and then up-conversion of the color signal C, resulting in time-axis expansion of the modified burst interval (as shown in FIG. 3B); and as a result, when the reproduced color video signal is displayed, substantial distortions and deterioration will be present, thus defeating the acceptance by a viewer of the copy-protected video signal.

Luminance signal Y produced by video signal reproducing device 1 and the copy-protected color signal C produced by burst placing circuit 4 are coupled to a terminal block 6 which constitutes the so-called S-output. As is known, the S-output includes separated luminance and chrominance signals which may be supplied to the S-input of a high quality video display. Nevertheless, even though the color signal C has been modified with the copy-protection signal, as aforedescribed, the color video picture displayed therefrom will exhibit no noticeable deterioration; but if the color signals at the S-output of terminal block 6 are recorded and subsequently reproduced by a consumer-type video recorder, the resultant picture that is displayed from the reproduced video signal will not be satisfactory.

Figure 5A:
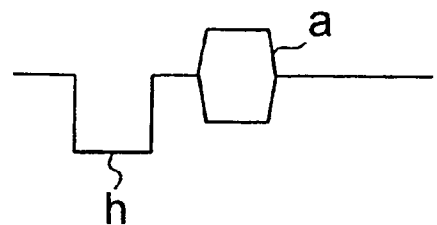
FIGS. 5A–5D are waveform diagrams which illustrate different embodiments of the present invention.

FIGS. 5A–5D illustrate the signals provided in the horizontal blanking interval of the color video signal as a result of the operation of the apparatus shown in FIG. 4. FIG. 5A is a waveform which illustrates the "normal" horizontal blanking interval and depicts the horizontal synchronizing signal h followed by the burst signal a, the latter being provided in the color signal C supplied to burst placing circuit 4 by video signal reproducing device 1.

Figure 5B:
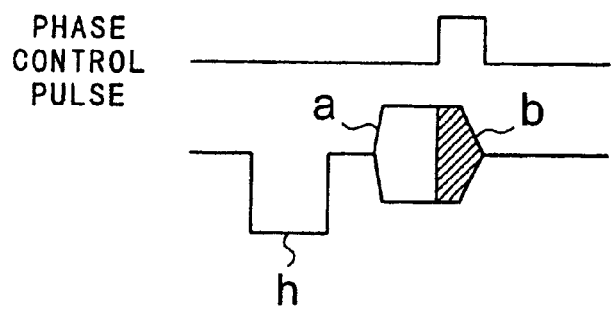

FIG. 5B illustrates the phase control pulse included in the timing control pulses generated by timing generator 2; and it is seen that burst signal generator 3 responds to the phase control pulse to generate the phase-shifted burst signal b at the timing which follows the reference phase burst signal. Burst placing circuit 4 inserts the phase-shifted burst signal generated by burst signal generator 3 into the burst interval, resulting in the modified burst interval shown in FIG. 5B.

Figure 5C:
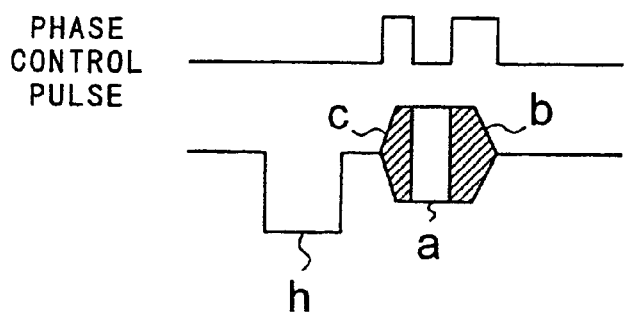

FIG. 5C illustrates two phase control pulses included in the timing control pulses, whereby burst generator 3 generates two durations of the phase-shifted burst signals b and c. Burst placing circuit 4 inserts the phase-shifted burst signals b and c into the burst interval, and as is seen in FIG. 5C, the duration of the reference phase burst signal is compressed.

Figure 5D:
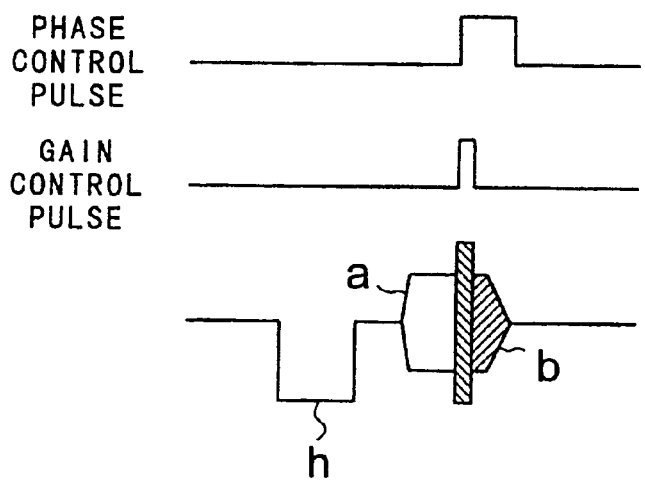

FIG. 5D illustrates a phase control pulse similar to that shown in FIG. 5B and, in addition, illustrates the gain control pulse that may be included in the timing control pulses supplied to burst signal generator 3. As discussed above, the burst signal generator responds to the gain control pulse to increase the gain, or amplitude level of a portion of the phase-shifted burst signal, such as is shown. It is appreciated that the width of the gain control pulse determines the width of that portion of the phase-shifted burst signal whose gain is increased. Burst placing circuit 4 inserts into the burst interval the gain-adjusted phase-shifted burst signal generated by burst signal generator 3, resulting in the modified burst interval shown in FIG. 5D.

Turning now to FIGS. 6A and 6D, an explanation is now provided for the implementation of one embodiment of the present invention. FIG. 6A illustrates the waveform of the pertinent portions of the horizontal blanking interval with the following timing notations: $t_1$–$t_2$ is the conventional burst interval; $t_5$–$t_1$ is referred to as the pre-burst interval because it is located immediately preceding the conventional burst interval $t_1$–$t_2$. $t_1$–$t_3$ is referred to as the beginning of the burst interval; and $t_4$–$t_2$ is referred to as the end of the burst interval. It will be appreciated that $t_3$–$t_4$ is less than the normal burst interval; and this occurs because the phase-shifted burst signal b and c "leaks" into the normal burst interval. Finally, $t_2$–$t_6$ is referred to as the post-burst interval because it occurs immediately following and outside the normal burst interval.

FIG. 6B illustrates a plurality of successive horizontal line intervals, for example, four line intervals, in which the copy protection signal of the present invention, that is, the phase-shifted first signal, is inserted into the burst interval of the color video signal. It will be seen that the precise locations of the phase-shifted color burst signal in the burst interval in each line changes slightly from line to line. Of course, the hatched portions shown in FIGS. 6A and 6B represent those portions of the burst interval in which the phase-shifted burst signal is inserted. In one embodiment, the line intervals of the video signal which contain the phase-shifted burst signal, that is, those line intervals which are subjected to copy protection, are included in the vertical blanking interval. In other embodiments, to be described, line intervals included in the display portion of the video picture contain the copy protection signal, (that is, the phase-shifted burst signal).

In the embodiment wherein the copy protection signal is located in those line intervals which are displayed in the video picture, it is preferred to generate a pattern of copy-protected lines. Here, the phase-shifted burst signal is inserted in a predetermined number of successive line intervals of the video signal, for example, in two successive line intervals or, alternatively, in four successive line intervals, thereby constituting a block. One field of the video signal is formed of plural blocks exhibiting a repetitive pitch. For example, successive blocks may be separated by 20 non-modified line intervals or by thirty non-modified line intervals or forty non-modified line intervals, etc. As anther example, successive blocks may be separated by one hundred non-modified line intervals.

In another example, rather than forming plural blocks exhibiting a repetitive pitch in only one field of the video signal, plural blocks exhibiting the aforementioned repetitive pitch may be provided in a frame of the video signal. Of course, in this alternative, a "block" is formed of two or four successive line intervals into which the phase-shifted burst signal has been inserted.

From FIG. 6B, it will be seen that the phase-shifted burst signal may be inserted into the burst interval in one or more of the following locations: $t_5$–$t_3$, $t_4$–$t_2$, $t_2$–$t_6$ and $t_4$–$t_6$. Of course, because of the down-conversion and up-conversion processing of the burst signal and the phase-shifted burst signal when the copy-protected color video signal is recorded and reproduced, as discussed above, the phase-shifted burst signal "leaks" into the reference phase burst signal and, additionally, exhibits time-axis expansion, thereby enlarging the opportunity for the PLL circuit of the conventional television receiver to follow the phase perturbations of the burst signal, resulting in significant defects and deteriorations in the reproduced video picture.

The selection of the number of successive line intervals which contain the copy protection signal (i.e., the phase-shifted burst signal) in accordance with the present invention is dependent, in part, on the susceptibility of conventional television receivers to lock onto the phase shifting burst signal that does not exhibit time-axis expansion. For example, if a copy-protected video signal is a "live" signal or a pre-recorded signal, four (or more) successive line intervals may include the phase-shifted burst signal if the PLL circuit of the television receivers admits of a high time constant, and a fewer number of successive line intervals may contain the phase-shifted burst signal if the time constant is lower.

FIGS. 7A and 7B schematically represent those fields of a frame which contain the copy-protected video signal shown in FIG. 6B. It is seen that each field or alternate fields may contain a number of lines having the phase-shifted burst signal therein. Alternatively, the copy protection signal may be inserted into the burst interval of a predetermined number of lines in every other frame. Still further, those lines which contain the copy protection signal may exhibit a so-called lattice shape.

Figure 8:
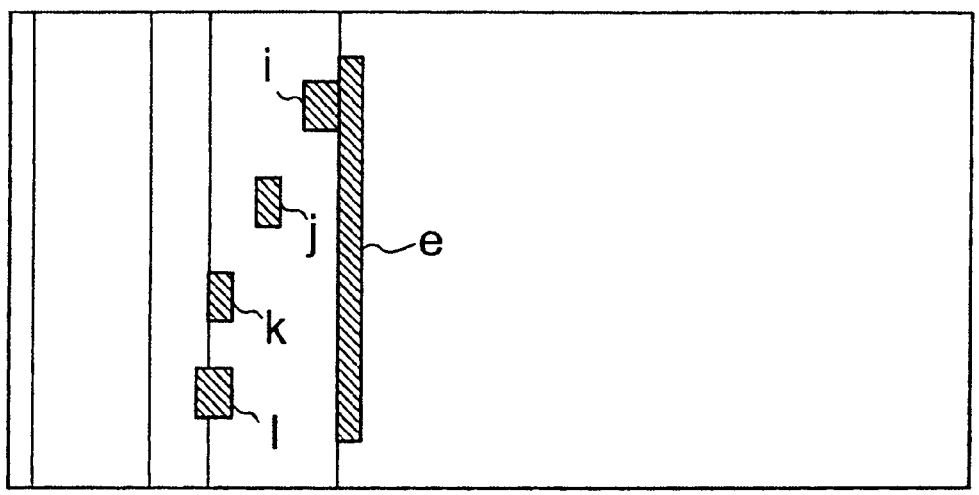
FIG. 8 schematically represents the location in a normal burst interval of phase-shifted burst signals in accordance with different embodiments of the present invention.

FIG. 8 schematically represents different configurations in which the phase-shifted burst signal may be inserted into the burst interval. Each hatched area is intended to identify the phase-shifted burst signal. In an actual implementation, one or more of the configurations may be adopted. It is seen, then, that the phase-shifted burst signal may exhibit different durations, as depicted in FIG. 8 by reference numerals e, i, j, k and l. Hence, the phase-shifted burst signal of duration e may be located in the post-burst interval, and is seen to commence when the normal burst interval ends and terminates a number of cycles (e.g., 2 cycles of the subcarrier) thereafter. The phase-shifted burst signal i is provided in the end of the burst interval $t_4$–$t_2$ and is seen to follow the reference phase burst signal. Phase-shifted burst signals e and i may be combined. Phase-shifted burst signal j is located in a central portion of the burst interval and is preceded and followed by the reference phase burst signal. Phase-shifted burst signal k is provided at the beginning of the burst interval $t_1$–$t_3$ and simply precedes the reference phase burst signal. Phase-shifted burst signal l is located in the pre-burst interval $t_5$–$t_1$ and also in the beginning of the burst interval $t_1$–$t_3$ and is seen to commence before the burst interval begins and terminate in the burst interval but before the reference phase burst signal begins. Since the circuitry used in consumer–type analog video recorders may differ from one manufacturer to another and from model to another, when different combinations of the phase-shifted burst signal shown in FIG. 8 are used, success in preventing the video recorder from satisfactorily copying the copy-protected video signal is virtually assured. Alternatively, different line intervals of the copy-protected video signal may contain different ones of the phase-shifted burst signals shown in FIG. 8. For example, one line may contain phase-shifted burst signal e, another may contain phase-shifted burst signal i, another may contain phase-shifted burst signal j, and so on.

Figure 9:
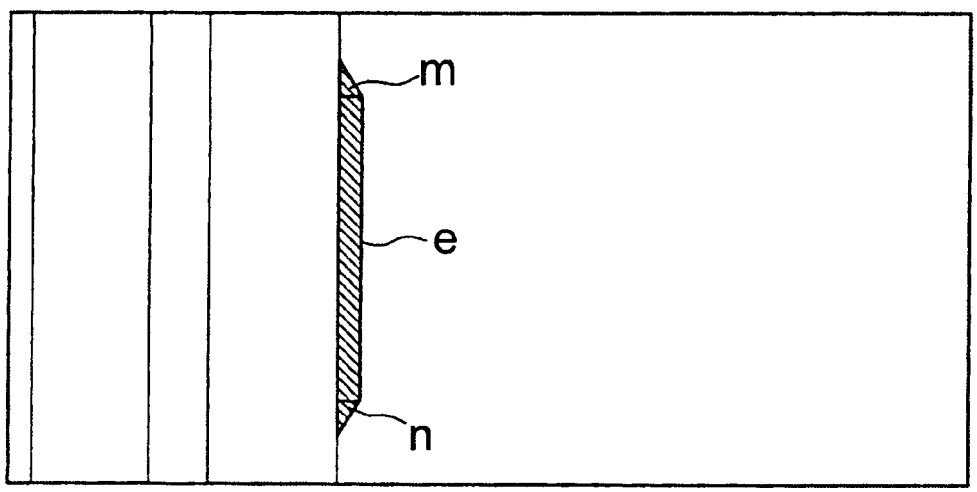
FIG. 9 schematically represents yet another embodiment of the manner in which phase-shifted color burst signals are inserted into the burst interval of a copy-protected video signal.
Figure 11:
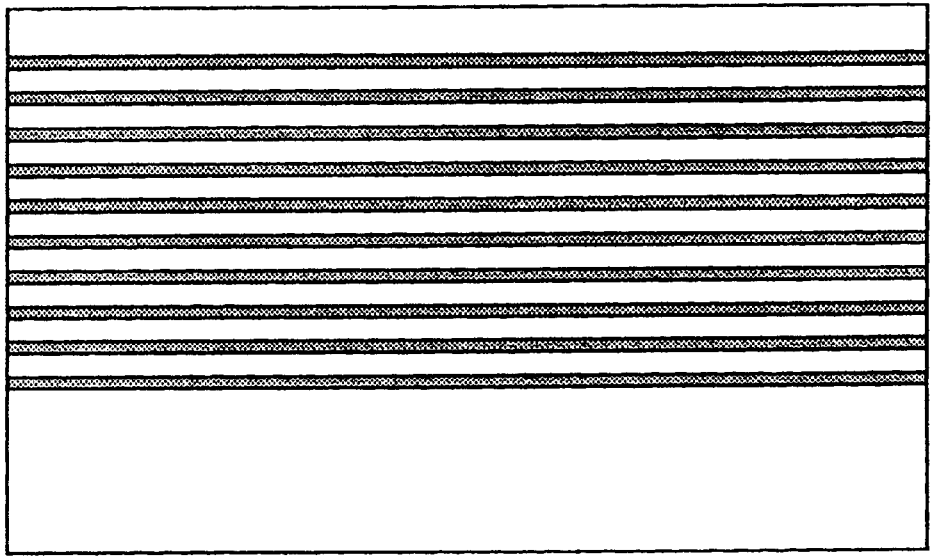
FIG. 11 schematically represents a video picture produced from a copy-protected video signal that has been subjected to color stripe processing.

It is possible that flicker in the displayed video picture reproduced from a "live" or pre-recorded copy-protected video signal may be present in the boundary between the line interval which contains the phase-shifted burst signal e and the next-following line interval which does not contain the phase-shifted burst signal. For example, if a block of 4 successive lines contains the phase-shifted burst signal e, such flicker may be present. To avoid this possibility, the duration of the phase-shifted burst signal is gradually increased from line to line at the beginning portion of the block and is gradually decreased from line to line at the ending portion of the block, as schematically depicted in FIG. 9. Here, portion m of the phase-shifted burst signal represents the gradual increase in the duration thereof, that is, a gradual increase in the duration of the phase-shifted burst signal e, and portion n represents the gradual decrease in the duration of the phase-shifted burst signal.

While the present invention has been particularly shown and described with reference to preferred embodiments, it will be readily appreciated by those of ordinary skill in the art that various changes and modifications may be made without departing from the spirit and scope of the invention. Some of these changes have been discussed and suggested above. Additionally, although burst signal generator 3 and burst placing circuit 4 (FIG. 4) insert the phase-shifted burst signal into the burst interval, it will appreciated that the reference phase burst signal may itself be phase modulated to achieve the same effect. That is, by phase modulation, the phase of predetermined portions of the burst signal may be changed.

It is intended that the appended claims be interpreted as including those embodiments which have been specifically described herein as well as all equivalents thereto, some of which have been described above and others will be apparent to those of ordinary skill in the art.

What is claimed is:

1. A method of allowing a direct reproduction of an analog color video signal and preventing said analog color video signal from being satisfactorily recorded and reproduced by an analog video recorder, wherein said analog color video signal includes a color burst signal of reference phase located in a burst interval in respective line intervals for reproducing said analog color video signal, said method comprising the steps of:

generating a phase-shifted color burst signal which undergoes a time-axis expansion when recorded and reproduced by said analog video recorder; and inserting said phase-shifted color burst signal in a predetermined location for a predetermined duration in an area of said burst interval of reference phase such that said phase-shifted color burst signal does not significantly interfere with the direct reproduction of said color analog video signal based on the color burst interval of reference phase and said time-axis expansion of said phase-shifted color burst signal significantly interferes with the color burst signal of reference phase thereby inhibiting the reproduction of the recorded analog color video signal when recorded and reproduced by said analog video recorder.

2. The method of claim 1 wherein said predetermined location precedes said color burst signal of reference phase such that said time-axis expansion eliminates any spacing between a horizontal synchronizing pulse and a beginning of said phase-shifted color burst signal.

3. The method of claim 2 wherein said predetermined duration commences before said burst interval begins and terminates in said burst interval.

4. The method of claim 1 wherein said predetermined location follows said color burst signal of reference phase.

5. The method of claim 4 wherein said predetermined duration commences when said burst interval ends.

6. The method of claim 4 wherein said predetermined duration commences before said burst interval ends and terminates a number of burst signal cycles after said burst interval ends.

7. The method of claim 1 wherein said predetermined location both precedes and follows said color burst signal of reference phase.

8. The method of claim 1 wherein said predetermined location is in a central portion of said burst interval.

9. The method of claim 1 wherein said phase-shifted color burst signal exhibits an amplitude substantially equal to that of the color burst signal of reference phase; and further comprising the step of changing the amplitude of only a portion of said phase-shifted color burst signal.

10. The method of claim 9 wherein said amplitude of only said portion of said phase-shifted color burst signal is increased.

11. The method of claim 1 wherein said phase-shifted color burst signal is inserted in a predetermined number of successive line intervals of said analog color video signal, thereby constituting a block of line intervals, and a predetermined field of said analog color video signal is formed of plural blocks forming a pattern of said plural blocks exhibiting a repetitive pitch.

12. The method of claim 1 wherein said phase-shifted color burst signal is inserted in a predetermined number of successive line intervals of said analog color video signal, thereby constituting a block of line intervals, and a frame of said analog color video signal is formed of plural blocks forming a pattern of said plural blocks exhibiting a repetitive pitch.

13. The method of claim 1 wherein said analog color video signal includes a vertical blanking interval; and wherein said phase-shifted color burst signal is inserted in predetermined line intervals of said vertical blanking interval.

14. The method of claim 4 wherein said phase-shifted color burst signal is inserted in a predetermined number of line intervals constituting a block; and wherein said predetermined duration gradually increases from line to line in those lines constituting a beginning portion of said block and gradually decreases from line to line in those lines constituting an ending portion of said block.

15. The method of claim 1 wherein said phase-shifted color burst signal is phase shifted by 180° relative to said reference phase.

16. The method of claim 1 wherein said phase-shifted color burst signal is phase shifted by 90° relative to said reference phase.

17. Apparatus for allowing a direct reproduction of an analog color video signal and preventing said analog color video signal from being satisfactorily recorded and reproduced by an analog video recorder, wherein said analog color video signal includes a color burst signal of reference phase located in a burst interval in respective line intervals for reproducing said analog color video signal, said apparatus comprising:

copy protection generating means for generating a phase-shifted color burst signal which undergoes a time-axis expansion when recorded and reproduced by said analog video recorder; and insertion means for inserting said phase-shifted color burst signal in a predetermined location for a predetermined duration in an area of said burst interval such that said phase-shifted color burst signal does not significantly interfere with display of the direct reproduction of said color analog video signal based on the color burst signal of reference phase and said time-axis expansion of said phase-shifted color burst signal significantly interferes with the color burst signal of reference phase reproduction of the recorded analog color video signal when recorded and reproduced by said analog video recorder.

18. The apparatus of claim 17 wherein said predetermined location precedes said color burst signal of reference phase such that said time-axis expansion eliminates any spacing between a horizontal synchronizing pulse and a beginning of said phase-shifted color burst signal.

19. The apparatus of claim 18 wherein said predetermined duration commences before said burst interval begins and terminates in said burst interval.

20. The apparatus of claim 17 wherein said predetermined location follows said color burst signal of reference phase.

21. The apparatus of claim 20 wherein said predetermined duration commences when said burst interval ends.

22. The apparatus of claim 20 wherein said predetermined duration commences before said burst interval ends and terminates a number of burst signal cycles after said burst interval ends.

23. The apparatus of claim 17 wherein said predetermined location both precedes and follows said color burst signal of reference phase.

24. The apparatus of claim 17 wherein said predetermined location is in a central portion of said burst interval.

25. The apparatus of claim 17 wherein said phase-shifted color burst signal exhibits an amplitude substantially equal to that of the color burst signal of reference phase; and said copy protection generating means is operable to change the amplitude of only a portion of said phase-shifted color burst signal.

26. The apparatus of claim 25 wherein said copy protection generating means increases the amplitude of only said portion of said phase-shifted color burst signal.

27. The apparatus of claim 17 wherein said insertion means is operable to insert said phase-shifted color burst signal in a predetermined number of successive line intervals of said analog color video signal, thereby constituting a block of line intervals, and to construct a predetermined field of said analog color video signal with plural blocks forming a pattern of said plural blocks exhibiting a repetitive pitch.

28. The apparatus of claim 17 wherein said insertion means is operable to insert said phase-shifted color burst signal in a predetermined number of successive line intervals of said analog color video signal, thereby constituting a block of line intervals, and to construct a frame of said analog color video signal with plural blocks forming a pattern of said plural blocks exhibiting a repetitive pitch.

29. The apparatus of claim 17 wherein said analog color video signal includes a vertical blanking interval; and wherein said insertion means is operable to insert said phase-shifted color burst signal in predetermined line intervals of said vertical blanking interval.

30. The apparatus of claim 20 wherein said insertion means is operable to insert said phase-shifted color burst signal in a predetermined number of line intervals constituting a block and to gradually increase said predetermined duration from line to line in those lines constituting a beginning portion of said block and to gradually decrease said predetermined duration from line to line in those lines constituting an ending portion of said block.

31. The apparatus of claim 17 wherein said phase-shifted color burst signal is phase shifted by 180° relative to said reference phase.

32. The apparatus of claim 17 wherein said phase-shifted color burst signal is phase shifted by 90° relative to said reference phase.

33. A copy-protected record medium on which is recorded a color video signal that is directly reproducible and not satisfactorily recorded and reproduced by an analog video recorder, said color video signal including a copy control signal and, when recovered for analog recording includes a color burst signal of reference phase located in a burst interval in respective line intervals for reproducing the color video signal, the burst interval having a predetermined location in which, during reproduction, a phase-shifted color burst signal, which undergoes a time-axis expansion when recorded and reproduced by said analog video recorder, is inserted for a predetermined duration in response to said copy control signal such that said phase-shifted color burst signal does not significantly interfere with display of the direct reproduction of said reproduced color analog video signal based on the color burst signal of reference phase and said time-axis expansion of said phase-shifted color burst signal significantly interferes with the color burst signal of reference phase thereby inhibiting reproduction of the recorded color video signal when recorded and reproduced by said analog video recorder signal.

34. The medium of claim 33 wherein said predetermined location precedes said color burst signal of reference phase such that said time-axis expansion eliminates any spacing between a horizontal synchronizing pulse and a beginning of said phase-shifted color burst signal.

35. The medium of claim 34 wherein said predetermined duration commences before said burst interval begins and terminates in said burst interval.

36. The medium of claim 33 wherein said predetermined location follows said color burst signal of reference phase.

37. The medium of claim 36 wherein said predetermined duration commences when said burst interval ends.

38. The medium of claim 36 wherein said predetermined duration commences before said burst interval ends and terminates a number of burst signal cycles after said burst interval ends.

39. The medium of claim 33 wherein said predetermined location both precedes and follows said color burst signal of reference phase.

40. The medium of claim 33 wherein said predetermined location is in a central portion of said burst interval.

41. The medium of claim 33 wherein said phase-shifted color burst signal exhibits an amplitude substantially equal to that of the color burst signal of reference phase; the amplitude of only a portion of said phase-shifted color burst signal having a larger amplitude.

42. The medium of claim 33 wherein said phase-shifted color burst signal is inserted in a predetermined number of successive line intervals of said recovered color video signal, thereby constituting a block of line intervals, and a predetermined field of said recovered color video signal is formed of plural blocks forming a pattern of said plural blocks exhibiting a repetitive pitch.

43. The medium of claim 33 wherein said phase-shifted color burst signal is inserted in a predetermined number of successive line intervals of said recovered color video signal, thereby constituting a block of line intervals, and a frame of said recovered color video signal is formed of plural blocks forming a pattern of said plural blocks exhibiting a repetitive pitch.

44. The medium of claim 33 wherein said recovered color video signal includes a vertical blanking interval; and wherein said phase-shifted color burst signal is inserted in predetermined line intervals of said vertical blanking interval.

45. The medium of claim 36 wherein said phase-shifted color burst signal is inserted in a predetermined number of line intervals of the recovered color video signal, constituting a block; and wherein said predetermined duration gradually increases from line to line in those lines constituting a beginning portion of said block and gradually decreases from line to line in those lines constituting an ending portion of said block.

46. The medium of claim 33 wherein said phase-shifted color burst signal is phase shifted by 180° relative to said reference phase.

47. The medium of claim 33 wherein said phase-shifted color burst signal is phase shifted by 90° relative to said reference phase.

* * * * *